United States Patent [19]

Wood et al.

[11] Patent Number: 4,972,145
[45] Date of Patent: Nov. 20, 1990

[54] SPEED SENSOR GAP FAULT-DETECTION ARRANGEMENT FOR MULTIPLE-AXLE RAIL VEHICLES

[75] Inventors: James A. Wood, Spartanburg; John W. Drake, Greenville, both of S.C.

[73] Assignee: American Standard Inc., Spartanburg, S.C.

[21] Appl. No.: 450,484

[22] Filed: Dec. 14, 1989

[51] Int. Cl.$^5$ .......................... G01B 7/14; B60T 8/88
[52] U.S. Cl. .............................. 324/160; 324/207.11; 324/207.12; 324/207.23; 324/207.26; 324/225; 324/226; 303/92
[58] Field of Search .................... 324/160, 176, 207.11, 324/207.12, 207.23, 207.25, 207.26, 225, 226, 243, 262; 303/92; 340/425.5, 438, 441, 501, 686; 364/426.02

[56] References Cited

U.S. PATENT DOCUMENTS 4,072,364 2/1978 Gudat et al. .................... 324/160

Primary Examiner—Reinhard J. Eisenzopf
Assistant Examiner—Walter E. Snow
Attorney, Agent, or Firm—J. B. Sotak

[57] ABSTRACT

A magnetic speed sensor air gap fault-detection arrangement having a two-input AND gate for each of the two-axle trucks of a railway vehicle for conditioning a gap process circuit common to each axle. Each of the gap process circuits of each axle is activated to provide a logical "1" output to an associated two-input AND gate. The associated two-input AND gates each outputs a logical "1" to a respective gap counter circuit when the axle rate reaches a predetermined value. The respective gap counter circuits count the logical "1's" and activate an associated gap fault check circuit to reset the respective gap counter circuit and to display an error code and to output a logical "1" signal to the dynamic diagnostic apparatus.

20 Claims, 2 Drawing Sheets

SPEED SENSOR GAP FAULT-DETECTION ARRANGEMENT FOR MULTIPLE-AXLE RAIL VEHICLES

FIELD OF THE INVENTION

This invention relates to a magnetic pickup air gap fault-detection arrangement for monitoring the distance between an electromagnetic sensor and the teeth of a rotary gear for determining a valid pickup sensor gap error and for preventing the simulation of a false wheel slip condition.

BACKGROUND OF THE INVENTION

In mass and/or rapid transit operations, it is common practice to employ an electromagnetic speed sensing device or signal generator to measure the velocity of the axles and/or wheels of the vehicles of a railway train. Generally, these previous electromagnetic speed generators included a tooth rotor or gear member coupled to the axles of the railway vehicle which moves past an electromagnetic stator or pickup member to produce signals which are directly proportional to the velocity or speed of the wheels of the railway vehicle. It will be appreciated that, while these speed sensing devices have operated satisfactorily to varying degrees, there are certain aspects which must be carefully considered and effectively dealt with in order to maximize the velocity measuring operation. An acceptable speed measuring device must be capable of withstanding extreme shock and vibrations which are ever present in a railway vehicular milieu. The violent and irregular agitation has a detrimental effect on any speed signal generator which utilizes frangible or unstable elements. Such previous apparatus is susceptible to breakage and misalignment of parts which either totally destroys or markedly reduces the signal generating ability of the speed sensing device. It has been found, from long-term wheel protection testing, that certain malfunctions in the speed sensors could erroneously simulate a wheel slip condition. For example, during testing, a foreign object or a piece of debris struck one of the gear teeth of the rotor. This resulted in the loss of a piece of one of the teeth of the gear. This caused a cycling of the brake cylinder pressure due to the lost tooth falsely appearing as a wheel slip. Thus, it was determined that the detection and management of this type of a malfunctional condition was required to be handled by the logic. The necessary logic to detect this situation was to be dealt with by the software. If this condition is sensed and detected, the axle signals from the affected axle will be substituted with the signals from the other axles on the truck. In practice, the impact of a broken gear or any other malfunction which exhibits similar symptoms can cause the brakes to pulse rapidly between release and application with a tendency to cause the brakes to be biased toward the released position. At low vehicular speeds, where the problem is the most pronounced, the net pressure of the brake cylinder can be reduced to zero on the affected truck. Further, if the train continues to run in actual service for as little as a half a day, the wheel slip control valve on the affected truck will undergo millions of brake release and application cycles which results in undue wear and can result in failure of the equipment.

OBJECTS AND SUMMARY OF THE INVENTION

Accordingly, it is an object of this invention to provide a unique magnetic pickup gap fault-detection arrangement for determining a valid air gap error.

Another object of this invention is to provide an electromagnetic speed sensor gap detection arrangement for railway vehicles which is capable of detecting a broken tooth on a rotary gear member.

A further object of this invention is to provide a vehicular speed sensor arrangement having a rotary tooth wheel and a stationary magnetic member which is spaced a given distance from the teeth of the wheel and which effectively detects a valid pickup sensor gap error to prevent the simulation of a wheel slip/spin detection and correction.

Still a further object of this invention is to provide a speed sensor gap detection arrangement which protects against faulty gap errors and which functions on both powered and non-powered vehicles.

Still another object of this invention is to provide a speed sensor arrangement which is capable of detecting and distinguishing between a faulty air gap and a slip control command to prevent excessive cycling of a slip control valve. In accordance with the present invention there is provided an improper speed sensor gap fault-detection arrangement for a multiple-truck vehicle comprising, a first logic circuit connected to a first pair of gap process circuits of a first truck of the vehicle, one of said first pair of gap process circuits connected to a second logic circuit and the other of said first pair of gap process circuits connected to a third logic circuit, said second logic network connected to a first gap counter circuit and said third logic circuit connected to a second gap counter circuit, said first gap counter circuit connected to a first gap fault check circuit and said second gap counter circuit to a second gap fault check circuit, a fourth logic circuit connected to a second pair of gap process circuits of a second truck of the vehicle, one of said second pair of gap process circuits connected to a fifth logic circuit and the other of the second pair of gap process circuits connected to a sixth logic circuit, said fifth logic circuit connected to a third gap counter circuit and said sixth logic circuit connected to a fourth gap counter circuit, said third gap counter circuit connected to a third gap fault check circuit and said fourth gap counter circuit connected to a fourth gap fault check circuit for validating a faulty air gap in the speed sensor and for preventing the simulation of a wheel slip/spin condition.

Further, according to this invention, there is provided an electromagnetic speed sensor arrangement for detecting an air gap error and for preventing a simulated wheel slip condition comprising, one two-input logic means for each two-axle truck of a vehicle, said one two-input logic means produces a logical "1" when the vehicle is in a brake mode and the highest speed of one of the two axles is greater than a preset value, a gap processing means for each axle of the two-axle truck, the gap processing means conditioned by the logical "1" of the two-input logic means for producing a logical "1" when the previous speed of an axle minus the present speed of the axle is at least a preselected value, another two-input logic means receiving the one logical "1" from the gap processing means and receiving another logical "1" when the axle rate of the axle is equivalent to a given rate to produce a logical "1," a gap counter means for receiving the logical "1" from the another two-input logic means and counting the logical "1's" and for activating a gap fault check means when the count reaches a predetermined setpoint to reset the gap counter means and to produce a gap fault error signal and an error code.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
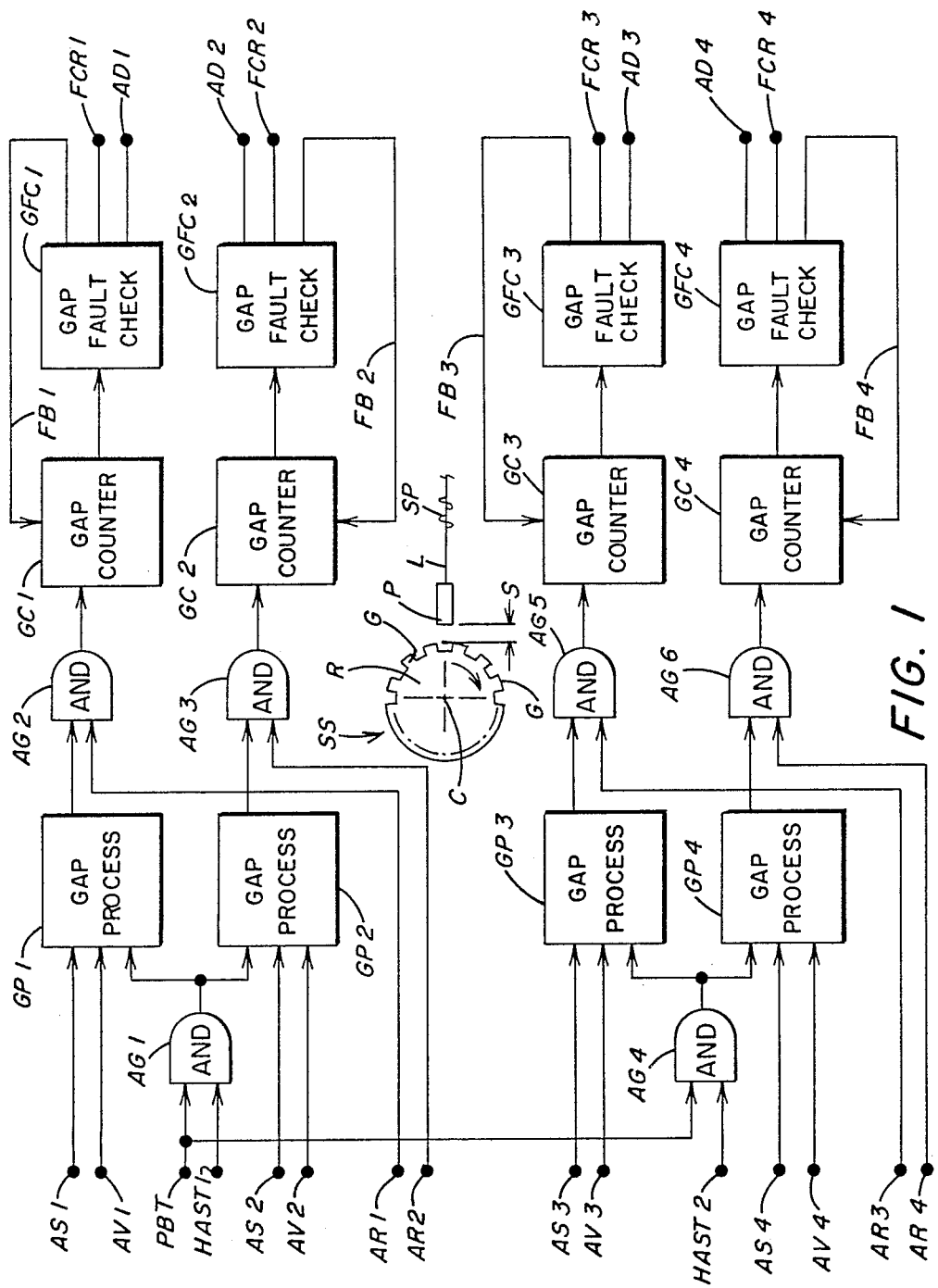
FIG. 1 is a schematic circuit diagram of an improper electromagnetic speed sensor air gap detection arrangement in accordance with the present invention.

Referring now to the drawings, and in particular to FIG. 1, there is shown a schematic circuit diagram of an improper speed sensor gap fault-detector arrangement having a plurality of logic networks and a number of discrete circuits to monitor and log a gap error. Each axle of the railway vehicle is provided with an electromagnetic speed sensor SS. As shown, the reference character R designates a toothed disc or a gear wheel which can be rotated about a center line or axis C. The gear R is suitably fitted or connected on each axle of both trucks of a railway vehicle (not shown). The circumference of the gear, disc or wheel R is provided with a toothed periphery which includes a plurality of equally-spaced teeth G. The rotational speed of each toothed rotor R is sensed and monitored by a separate associated electromagnetic pickup device or sensor P having a pole face which is normally set at a selected distance S from the tip of teeth G. In practice, the air gap distance S is set at between 0.02 to 0.035 inch to attain the best results in the present application. When the tooth wheel R is rotating, an alternating current signal or A.C. voltage SP is developed on conductive lead L which is conveyed to appropriate amplifying, filtering, buffing and pulse-shaping circuits for producing suitable signals or pulses for subsequent processing. It will be appreciated that the pulse rate or frequency of the electrical signals SP is directly proportional to the rotational speed of the wheel axle unit or rotor R which, in turn, is dependent upon the velocity of the vehicle while the magnitude of the pulses is dependent upon the distance S that the pole piece of the electromagnetic pickup sensor P is situated from the periphery of the tooth wheel R. It will be appreciated that lead L is connected to a suitable frequency-to-voltage converter which produces an output voltage which is proportional to the frequency of signal pulses induced in sensor P. The converted voltage signal of each sensor is fed to a delay circuit which introduces a time delay for a specified period of time forming velocity signal and to a differentiator which also produces an output substantially in proportion to the rate of change of the input voltage as will presently be described.

As shown, a first two-input AND logic gate circuit AG1 has one input connected to terminal PBT, while the other input is connected to terminal HAST1. The logical signal appearing on input terminal PBT may be derived from a brake release pressure switch or may be produced by the propulsion equipment. Thus, the logical signal on terminal PBT signifies whether the train is in a power or brake mode. The signal on the input terminal HAST1 is determined by the highest prevailing speed registered by a given axle on the first truck of the vehicle. Now if the vehicle is in the brake mode and the highest axle speed is greater than a given preset level or value, namely, higher than three (3) miles per hour (mph), then the AND gate AG1 outputs a logical "1." As it will be observed, the output of the AND gate AG1 is connected to one input of the three (3) inputs of a first gap process sensing circuit GP1 as well as to one input of the three (3) inputs of a second gap process sensing circuit GP2. The other two inputs of the gap process circuit GP1 are connected to input terminals AS1 and AV1. The input speed signal appearing on terminal AS1 is the current speed of the No. 1 axle in mph that the vehicle is presently accelerating or decelerating as it moves along its route of travel. The input velocity signal appearing on terminal AV1 is the previous speed of the No. 1 axle in mph at which the vehicle was formerly moving. Now when the AND gate AG1 outputs a logical "1" to the gap process sensor or circuit GP1, it performs a comparison operation of the value of the No. 1 axle speed with the value of the No. 1 axle velocity. Thus, if the previous axle speed minus the current axle speed is greater than or equal to a preselected value, namely, one (1) mph, the gap process sensor GP1 outputs a logical "1" to one input of a second two-input AND gate AG2.

As shown, the other two (2) inputs of the second gap process circuit GP2 are connected to input terminals AS2 and AV2. The input speed signal developed on terminal AS2 is the present speed of the No. 2 axle in mph that the vehicle is currently accelerating or decelerating as it passes along its route of travel. The input velocity signal developed on terminal AS2 is the former speed of No. 2 axle in mph which the vehicle was previously traveling. If the AND gate AG1 supplies a logical "1" to the one input of the gap process sensor GP2, a comparison function is performed on the No. 2 axle speed and the No. 2 axle velocity. Accordingly, if the former axle speed minus the present axle speed is greater than or equal to one (1) mph, the gap process sensor GP2 outputs a logical "1" to one input of a third two-input AND gate AG3.

It will be seen that the other input of the second two-input AND gate AG2 is connected to terminal AR1 while the other input of the third two-input AND gate AG3 is connected to the terminal AR2. Now if the axle rate of the No. 1 axle reaches or is equivalent to a negative 25.6 miles per hour per second (mphps) and the output from the gap process sensor GP1 is a logical "1," the AND gate AG2 supplies a logical "1" to the input of a first gap counter circuit GC1. Similarly, if the axle rate of the No. 2 axle is equivalent to a negative 25.6 mphps rate and the output of the gap process sensor GP2 is a logical "1," the AND gate AG3 supplies a logical "1" to the input of a second gap counter circuit GC2. The gap counter GC1 is incremented each time a logical "1" is received from the AND gate AG2, and the gap counter GC2 is incremented each time a logical "1" is received from the AND gate AG3. The output count of the gap counter GC1 is fed to a gap fault check circuit GFC1 while the output count of the gap counter GC2 is fed to a gap fault check circuit GFC2. The output counts of gap counters GC1 and GC2 represent the number of gap faults that have occurred and have been diagnosed for the respective axles of the first truck of the vehicle. Now when either of the respective gap fault check circuits GFC1 or GFC2 reaches a predetermined fault setpoint, such as a count of seven (7), the following conditions occur: First, the gap fault check circuit GFC1 conveys a reset signal to the gap counter GC1 via feedback path FB1 for resetting it to a zero (0) count. Next, the gap fault check circuit GFC1 outputs a gap fault error signal on terminal FCR1 which is logged in the system error log equipment and causes an appropriate seven-segment error code to be switched on a display board and which is also sent to the failure code random access memory (RAM) module. Finally, the gap fault check circuit GFC1 outputs a logical "1" on terminal AD1 which is conveyed to the diagnostics of the No. 1 axle.

Similarly, when a seven (7) count is conveyed to the gap fault check circuit GFC2, it outputs a reset signal to the gap counter GC2 via feedback path FB2 for resetting it to a zero (0) count. Next, the gap fault check circuit GFC2 also outputs a gap fault error signal on terminal FCR2 which is logged and displayed, and outputs a logical "1" on terminal AD2 which is sent to the diagnostics of the No. 2 axle.

Turning now to the two axles of the second truck of the vehicle, it will be observed that a fourth two-input AND gate AG4 has one input connected to terminal PBT while the other input is connected to terminal HAST2. As previously mentioned, the logical signal developed on terminal PBT denotes whether the train is in the power or brake mode while the logical signal on terminal HAST2 is produced by the highest prevailing speed developed by one of the two axles of the second truck. Again, assuming that the vehicle is running in a brake mode and that the highest axle speed is greater than 3 mph, then the AND AG4 outputs a logical "1." It will be noted that the logical output of AND gate AG4 is connected to one input of the three (3) inputs of a third gap process sensing circuit GP3 as well as to one input of a fourth gap process sensing circuit GP4. As shown, the other two inputs of the gap process sensor GP3 are connected to input terminals AS3 and AV3. The input speed signal developed on terminal AS3 is the present speed of the No. 3 axle in mph that the vehicle is actually moving. The input velocity signal developed on terminal AV3 is the former speed of the No. 3 axle in mph at which the vehicle was previously traveling. Now, if the AND gate AG4 outputs a logical "1," the gap processor sensor GP3 compares the speed and velocity of the No. 3 axle. It will be understood that if the former axle speed minus the present axle speed is greater than or equal to one (1) mph, the gap process sensor GP3 outputs a logical "1" to one input of the fifth two-input AND gate AG5.

It will be seen that the other two inputs of the fourth gap process sensor GP4 are connected to terminals AS4 and AV4. The input speed signal appearing on terminal AS4 is the current speed in mph of No. 4 axle that the vehicle is accelerating or decelerating as it moves along its route of travel. The input velocity signal appearing on terminal AV4 is the former speed in mph of No. 4 axle at which the vehicle was previously traveling. Now if the AND gate AG4 supplies a logical "1" to the one input of the gap process sensor GP4, a comparison takes place between the former speed and the present speed of the No. 4 axle. If the former axle speed minus the present axle speed is greater than or equal to one (1) mph the gap process sensor GP4 outputs a logical "1" that is conveyed to one input of a sixth two-input AND gate AG6.

It will be noted that the other input of the fifth two-input AND gate AG5 is connected to terminal AR3 while the other input of the sixth two-input AND gate AG6 is connected to terminal AR4. Now if the axle rate of the No. 3 axle is equivalent to a negative 25.6 mphps rate and the output from the gap process sensor GP3 is a logical "1", the AND gate AG5 outputs a logical "1" to the input of the gap counter circuit GC3. In a like manner, if the axle rate of the No. 4 axle is equivalent to a 25.6 mphps rate and the output of the gap process sensor or circuit GP4 is a logical "1", then the AND gate AG6 outputs a logical "1" to the input of the gap counter circuit GC4. The gap counter GC3 is successively stepped or incremented each time a discrete logical "1" is received from the AND gate AG5, and the gap counter GC4 is successively stepped or incremented each time a logical "1" is received from the AND gate AG6. The output count from the gap counter GC3 is conveyed to a third gap fault check circuit GFC3 while output count from the gap counter GC4 is conveyed to a fourth gap fault check circuit GFC4. The output counts of the gap counters GC3 and GC4 signify the number of gap errors that have been encountered by the respective speed sensor unit of the respective associated axles and have been diagnosed as valid faults on the second truck of the vehicle. Now when either of the respective gap fault check circuits GFC3 or GFC4 reaches a preselected value, such as, a seven (7) count, the following mode of operation occurs. Initially, the gap fault check circuit GFC3 conveys a reset signal to the gap counter GC3 via a feedback circuit FB3 for resetting it to a zero (0) count. Next, the gap fault check circuit GFC3 outputs a gap fault error signal on terminal FCR3 which is logged in the system error log equipment and causes a seven-segment error code digital display to be switched on the display board and is also sent to the failure code random access memory (RAM) module. Finally, the gap fault check circuit GFC3 outputs a logical "1" on terminal AD3 which is conveyed to the dynamic diagnostics of the No. 3 axle.

In a like manner, when a seven (7) count is fed to the gap fault check circuit GFC4, it outputs a reset signal to the gap counter GC4 via a feedback path FB4 for resetting it to a zero (0) condition. The gap fault check circuit also outputs a gap fault error signal on terminal FCR4 which is logged and displayed and outputs a logical "1" which is sent to the diagnostics of the No. 4 axle.

Figure 2:
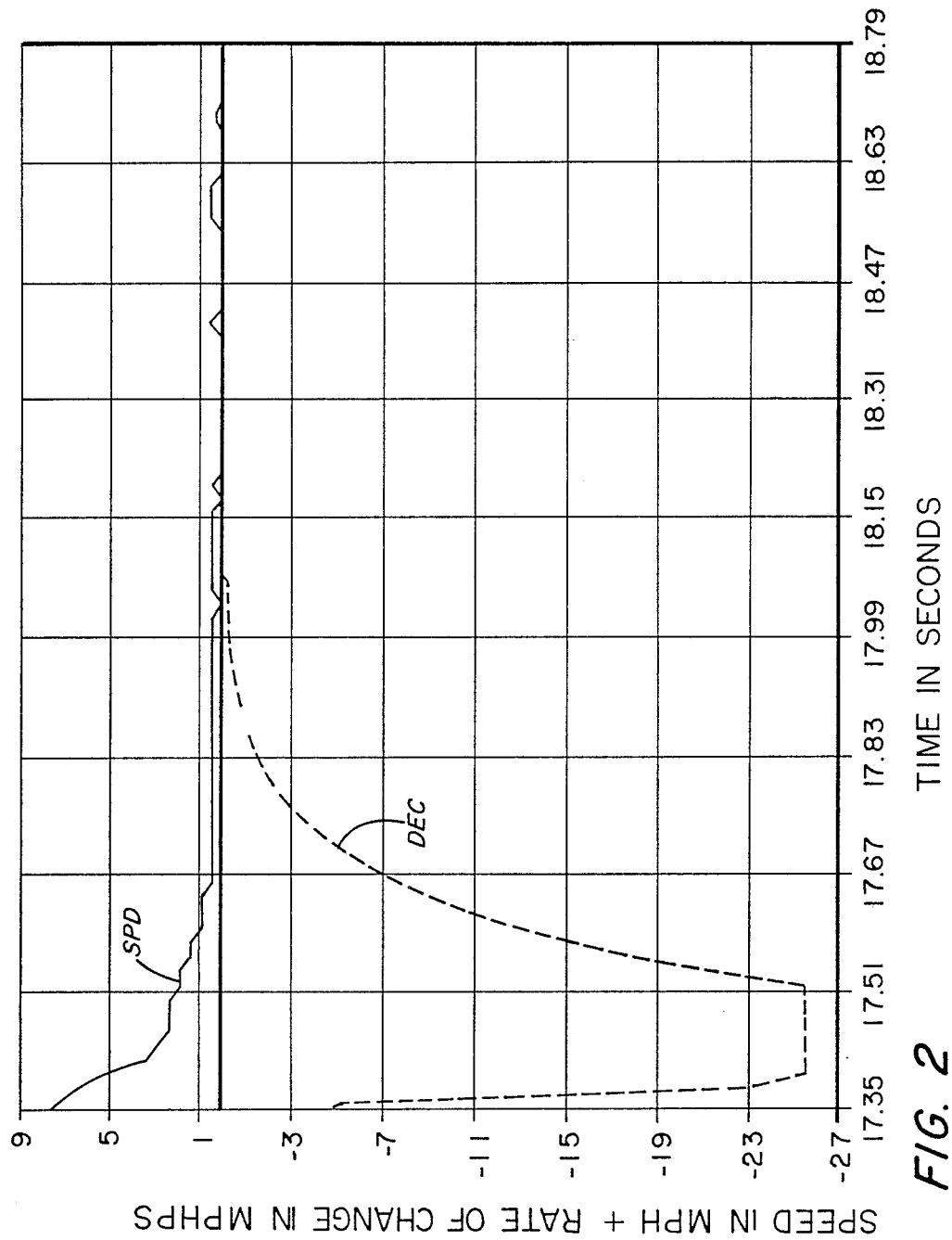
FIG. 2 is a graphical illustration of the speed versus time and acceleration versus time curves which will be of assistance in more readily understanding the operation of the improper electromagnetic speed sensor air gap detection arrangement of FIG. 1.

Referring now to FIG. 2, there is shown the speed and deceleration versus time of the gap fault axle relating to the operation of the apparatus of FIG. 1. The axle speed curve is represented by the solid line SPD while the deceleration rate curve is represented by the dashed line DEC. Let us assume that the distance S for one or more teeth have been changed due to a tooth R being broken by a foreign flying object or due to the rotor R being knocked out of round. In such a case, the distance S will vary as the rotor R rotates about the center axis C. Let us assume that a tooth is missing so that the sensor P senses a marked decrease in the speed as shown by the drop of the curve SPD between the 17.35 and 17.51 second points. The drop in speed results in a dramatic drop in the corresponding rate of change or deceleration which in this case is approximately 25.6 mphps as depicted by curve DEC. The conditions for determining a gap fault are as follows:

1. The difference between a previous axle speed minus the current speed of the same axle is greater than or equal to one (1) mph;
2. The train is a brake mode;
3. The highest axle speed on a truck is greater than three (3) mph, and
4. An axle rate is equivalent to a negative 25.6 mphps so that the respective AND gates AG2, AG3, AG5 or AG6 or all the AND gates will convey a logical "1" or a one count to the respective gap counters GC1, GC2, GC3 or GC4. In the present equipment, a gap count of seven (7) will actuate or effectively cause one of the gap fault check circuits GFC1-GFC4 to reset its respective gap counter circuit to zero (0) count, to output a specific code to the system error log so that the appropriate error code is displayed by a seven-segment display of the failure code RAM, and to output a logical "1" to the specific axle during diagnostic apparatus.

In practice, the present fault gap detector will function properly on powered vehicles as well as on non-powered vehicles. It is essential to the efficient operation to insure that the wheel slip/spin detection and correction portion of the speed control unit is not inadvertently disabled or locked out by erroneous air gap fault signals. This is accomplished by a fault tolerance in the design of the equipment in a voltage spike emanating in the analog-to-digital (A/D) conversion circuitry so that it will not cause a lockout of the axle's input signal during the twenty (20) millisecond program cycle. Thus, the fault tolerance design in the detection of a gap error is to validate the authenticity of the error detection process.

Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

We claim:

1. An improper speed sensor gap fault-detection arrangement for a multiple truck vehicle comprising, a first logic circuit connected to a first pair of gap process circuits of a first truck of the vehicle, one of said first pair of gap process circuits connected to a second logic circuit and the other of said first pair of gap process circuits connected to a third logic circuit, said second logic network connected to a first gap counter circuit and said third logic circuit connected to a second gap counter circuit, said first gap counter circuit connected to a first gap fault check circuit and said second gap counter circuit to a second gap fault check circuit, a fourth logic circuit connected to a second pair of gap process circuit of a second truck of the vehicle, one of said second pair of gap process circuits connected to a fifth logic circuit and the other of the second pair of gap process circuits connected to a sixth logic circuit, said fifth logic circuit connected to a third gap counter circuit and said sixth logic circuit connected to a fourth gap counter circuit, said third gap counter circuit connected to a third gap fault check circuit and said fourth gap counter circuit connected to a fourth gap fault check circuit for validating a faulty air gap in the speed sensor and for preventing the simulation of a wheel slip/spin condition.

2. The improper speed sensor gap fault-detection arrangement as defined in claim 1, wherein said first logic circuit is a two-input AND gate.

3. The improper speed sensor gap fault-detection arrangement as defined in claim 1, wherein said second logic circuit is a two-input AND gate.

4. The improper speed sensor gap fault-detection arrangement as defined in claim 1, wherein said third logic circuit is a two-input AND gate.

5. The improper speed sensor gap fault-detection arrangement as defined in claim 1, wherein said fourth logic circuit is a two-input AND gate.

6. The improper speed sensor gap fault-detection arrangement as defined in claim 1, wherein said first gap fault check circuit resets said first gap counter circuit to a zero count.

7. The improper speed sensor gap fault-detection arrangement as defined in claim 1, wherein said second gap fault check circuit resets said second gap counter circuit to a zero count.

8. The improper speed sensor gap fault-detection arrangement as defined in claim 1, wherein said third gap fault check circuit resets said third gap counter circuit to a zero count.

9. The improper speed sensor gap fault-detection arrangement as defined in claim 1, wherein said fourth gap fault check circuit resets said fourth gap counter circuit to a zero count.

10. The improper speed sensor gap fault-detection arrangement as defined in claim 1, wherein said first gap process circuit outputs a logical "1" when a logical "1" is received from said first logic circuit and the previous speed of a first axle minus the current speed of the first axle is greater than or equal to a preselected value.

11. The improper speed sensor gap fault-detection arrangement as defined in claim 1, wherein said second gap process circuit outputs a logical "1" when a logical "1" is received from said first logic circuit and the previous speed of a second axle minus the current speed of the second axle is greater than or equal to a preselected value.

12. The improper speed sensor gap fault-detection arrangement as defined in claim 1, wherein said third gap process circuit outputs a logical "1" when a logical "1" is received from said fourth logic circuit and the previous speed of a third axle minus the current speed of the third axle is greater than or equal to a preselected value.

13. The improper speed sensor gap fault-detection arrangement as defined in claim 1, wherein said fourth gap process circuit outputs a logical "1" when a logical "1" is received from said fourth logic circuit and the previous speed of a fourth axle minus the current speed of the fourth axle is greater than or equal to a preselected value.

14. An electromagnetic speed sensor arrangement for detecting an air gap error and for preventing a simulated wheel slip condition comprising, one two-input logic means for each two-axle truck of a vehicle, the one of two-input logic means produces a logical "1" when the vehicle is in a brake mode and the highest speed of one of the two axles is greater than a preset value, a gap processing means for each axle of the two-axle trucks, said gap conditioning means conditioned by the logical "1" of the two-input logic means for producing a logical "1" when the previous speed of an axle minus the present speed of the axle is at least a preselected value, another two-input logic means receiving the one logical "1" from the gap processing means and receiving another logical "1" when the axle rate of the axle is equivalent to a given rate to produce a logical "1", a gap counter means for receiving the logical "1" from the another two-input logic means and counting the logical "1's" and for activating a gap fault check means when the count reaches a predetermined setpoint to reset the gap counter means and to produce a gap fault error signal and an error code.

15. The electromagnetic speed sensor arrangement as defined in claim 14, wherein said one two-input logic means is an AND gate.

16. The electromagnetic speed sensor arrangement as defined in claim 14, wherein said another two-input logic means is an AND gate.

17. The electromagnetic speed sensor arrangement as defined in claim 14, wherein the preselected value is at least one (1) mph.

18. The electromagnetic speed sensor arrangement as defined in claim 14, wherein a feedback circuit extends from said gap fault check means to said gap counter means.

19. The electromagnetic speed sensor arrangement as defined in claim 14, wherein said given rate is at least $-25.6$ mphps.

20. The electromagnetic speed sensor arrangement as defined in claim 14, wherein said predetermined setpoint is at least a seven (7) count.

* * * * *